United States Patent

Okanoue

[11] Patent Number: 5,673,288
[45] Date of Patent: Sep. 30, 1997

[54] SYSTEM AND METHOD FOR ADAPTIVE MAXIMUM LIKELIHOOD SEQUENCE ESTIMATION

[75] Inventor: Kazuhiro Okanoue, Tokyo, Japan

[73] Assignee: NEC Corporation, Japan

[21] Appl. No.: 361,184

[22] Filed: Dec. 21, 1994

[30] Foreign Application Priority Data

Dec. 24, 1993 [JP] Japan .................................. 5-326657

[51] Int. Cl.$^6$ .................................................. H03M 13/12
[52] U.S. Cl. ........................... 375/231; 375/262; 375/341; 375/348; 375/350; 371/43
[58] Field of Search ................................ 375/229, 231, 375/232, 262, 341, 348, 349, 350; 364/724.2; 371/43

[56] References Cited

U.S. PATENT DOCUMENTS

| | | | |
|---|---|---|---|
| 5,228,058 | 7/1993 | Ushirokawa et al. | 375/348 |
| 5,303,263 | 4/1994 | Shoji et al. | 375/341 |
| 5,519,727 | 5/1996 | Okanoue et al. | 375/348 |

FOREIGN PATENT DOCUMENTS

| | | |
|---|---|---|
| 419225 | 3/1991 | European Pat. Off. . |
| 453814 | 10/1991 | European Pat. Off. . |
| 516133 | 12/1992 | European Pat. Off. . |

OTHER PUBLICATIONS

Proakis, *Digital Communications*, Digital Signaling Over a Channel With Intersymbol Interference, Chapter 6, pp. 394–401 and 410–413 (1983).

Duel–Hallen, et al., *IEEE, Trans on Commun.* 37(5):428–436 (1989).

*Primary Examiner*—Stephen Chin
*Assistant Examiner*—Don Vo
*Attorney, Agent, or Firm*—Ostrolenk, Faber, Gerb & Soffen, LLP

[57] ABSTRACT

A maximum likelihood sequence estimator implemented to cope with an intersymbol interference from a single symbol employs a necessary channel impulse response estimation vector of two components for a decision to estimate a maximum likelihood sequence. A channel impulse response estimator implemented to estimate a channel impulse response in consideration of intersymbol interferences from up to two symbols outputs a channel impulse response estimation vector of three components. The three-component vector is input to a converter, where it is converted into the two-component vector to be output to the maximum likelihood sequence estimator.

12 Claims, 4 Drawing Sheets

SYSTEM AND METHOD FOR ADAPTIVE MAXIMUM LIKELIHOOD SEQUENCE ESTIMATION

BACKGROUND OF THE INVENTION

The present invention relates to a system for a decision to conduct an adaptive estimation of a maximum likelihood sequence, and to a method for the same. More specifically, it relates to a system for as well as a method for conducting an adaptive maximum likelihood sequence estimation in processing a reception signal including a number of symbols subjected to distortions due to an intersymbol interference from among thereof to output a decision result.

DESCRIPTION OF THE RELATED ART

As an adapted system to equalize distortions due to an intersymbol interference variable with time, there has been known a maximum likelihood sequence estimation circuit including a maximum likelihood sequence estimator having an expected equalizable length of the intersymbol interference in terms of a number of components of an associated estimation vector, and a channel impulse response estimator for estimating a channel impulse response to generate an intersymbol interference of the expected length, e.g. in "Digital Communications" by J. G. Proakis, 1983, MacGrow-Hill, Chapter 6.

Figure 1:
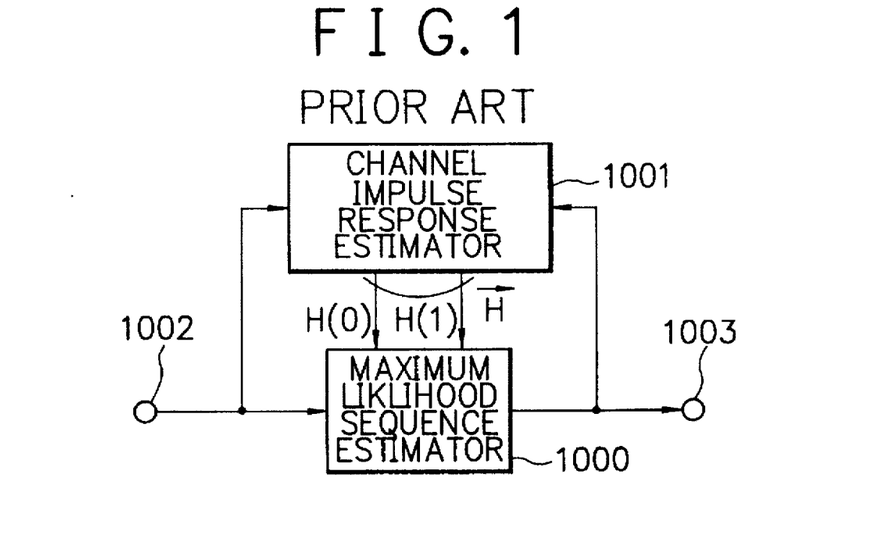
FIG. 1 is a block diagram of a conventional adaptive maximum likelihood sequence estimation system.

FIG. 1 shows an example of that conventional system. The exemplarily shown system comprises a maximum likelihood sequence estimator 1000 implemented to equalize distortions due to an intersymbol interference from a single symbol, and a channel impulse response estimator 1001 for estimating a channel impulse response of two components to generate an intersymbol interference from a single symbol.

There also has been known an employable reception system, such as in a case the time variation of an intersymbol interference is neglectable, to make use of a past decision result to cope with distortions due to a longer intersymbol interference than an expected equalizable length, e.g. in "Delayed Decision-Feedback Sequence Estimation" by Alexandra Duel-Hallen, et. al., IEEE, Trans. on Commun., Vol. 37, No. 5, May 1989.

The shown system in FIG. 1, however, provides an insufficient estimation of channel impulse response, such as when a channel variation causes an intersymbol interference from two symbols, even if the channel impulse response estimator 1001 is supplied with a correct decision result. As a result, an estimated value of channel impulse response with a reduced accuracy is supplied to the maximum likelihood sequence estimator 1000, which thus tends to make an erroneous decision. An erroneous decision the more reduces the estimation accuracy of channel impulse response, causing an unstable circuit action to be developed, propagating an erroneous decision result. To prevent such undesirable actions, one may design in advance a system having a sufficient performance to cope with an intersymbol interference from multiple symbols, but with a complicated constitution.

On the other hand, in the system employing a past decision result to cope with distortions due to an intersymbol interference exceeding a preset equalizable length, an unavoidable delay of time for obtaining a decision result provides the system with a reduced followability to variations with time. One may minimize the delay to increase the followability to variations with time, but accompanying a reduced reliability on the result of decision, thus permitting an insufficient minimization. Moreover, this system needs additional implementations such as by a control or memory to eliminate those components unequalizable by use of a past decision result, thus resulting in a complicated constitution.

SUMMARY OF THE INVENTION

The present invention has been achieved with such points in mind.

It is therefore an object of the present invention to provide, for use in a transmission system for transmitting data through channels subjected to an intersymbol interference variable with time, a simple adaptive maximum likelihood sequence estimation system that can follow temporal variations of the intersymbol interference without a reduced transmission performance, even if distortions are caused by a longer intersymbol interference than expected, as well as a method for the same.

To achieve the object, a genus of the present invention provides a system for a decision to conduct an adaptive maximum likelihood sequence estimation by equalizing a reception signal to thereby output a decision result, the reception signal having distortions due to an intersymbol interference from among N symbols, where N is an integer. The system comprises a maximum likelihood sequence estimator means, a channel impulse response estimator means and a converter means.

The maximum likelihood sequence estimator means executes the decision depending on a channel impulse response estimation vector of N+1 components representative of an estimated channel impulse response.

The channel impulse response estimator means generates a channel impulse response estimation vector of M+1 components representative of an intersymbol interference from among M symbols, where M is such an integer that 0<N<M, depending on the reception signal and the decision result.

The converter means converts the channel impulse response estimation vector of M+1 components into the channel impulse response estimation vector of N+1 components.

According to a species of the genus of the invention, the converter means comprises a power detector group, an adder group, a maximum value detector means and a control means.

The power detector group consists of M+1 power detectors each for determining a power value representative of channel impulse response power of a corresponding component of the channel impulse response estimation vector of M+1 components.

The adder group consists of M−N+1 adders each for determining a sum value of the power value of continuous N+1 components of the channel impulse response estimation vector of M+1 components, covering the M+1 components.

It will be understood that the adder group converts the channel impulse response estimation vector of M+1 components into an intermediate parameter vector of M−N+1 components which are one-to-one correspondent to the adders, respectively, to thereby reduce the length of an estimated channel impulse response.

The maximum value detector means detects a maximum one of the respective sum values determined by the M−N+1 adders.

The control means determines corresponding N+1 components to a corresponding adder to the maximum sum value of the channel impulse response estimation vector of M+1 components and for selecting the corresponding N+1 components to generate the channel impulse response estimation vector of N+1 components.

According to an individual of the species of the invention, each power detector of the power detector group generates a corresponding component of a channel impulse response power estimation vector of M+1 components representing the power value, and each adder of the adder group determines the sum value from corresponding N+1 components of the channel impulse response power estimation vector.

According to another individual of the species of the invention, the control means comprises a controller for generating a control signal representative of the corresponding N+1 components to the corresponding adder to the maximum sum value of the channel impulse response estimation vector of M+1 components, and a switch means for responding the control signal to select the corresponding N+1 components of the channel impulse response estimation vector of M+1 components to thereby generate the channel impulse response estimation vector of N+1 components.

Moreover, to achieve the object, another genus of the present invention provides a system for a decision to conduct an adaptive maximum likelihood sequence estimation by equalizing a reception signal on a burst consisting of a training sequence field and a data sequence field to thereby output a decision result, the reception signal having distortions due to an intersymbol interference from among N symbols, where N is an integer. The system comprises a maximum likelihood sequence estimator means, a timing control means, a training sequence pattern generating means, an output means, a channel impulse response estimator means and a converter means.

The maximum likelihood sequence estimator means executes the decision depending on a channel impulse response estimation vector of N+1 components representative of an estimated channel impulse response.

The timing control means generates a monitoring signal while detecting the training sequence field.

The training sequence pattern generating means generates a training sequence pattern while detecting the monitoring signal.

The output means outputs the training sequence pattern while detecting the monitoring signal, and the decision result while not detecting the monitoring signal.

The channel impulse response estimator means generates a channel impulse response estimation vector of M+1 components representative of an intersymbol interference from among M symbols, where M is such an integer that 0<N<M, depending on the reception signal on the burst and on the training sequence pattern and the decision result, as either of these is output from the outputting means.

The converter means converts the channel impulse response estimation vector of M+1 components into the channel impulse response estimation vector of N+1 components, while detecting the monitoring signal.

According to this genus of the invention, a reliable decision result is prepared before a maximum likelihood sequence estimator means enters processing a data sequence of a reception signal.

According to a species of this genus of the invention, the converter means comprises a power detector group, an adder group, a channel impulse response setting means and a control means.

The power detector group consists of M+1 power detectors each for determining a power value representative of channel impulse response power of a corresponding component of the channel impulse response estimation vector of M+1 components.

The adder group consists of M−N+1 adders each for determining a sum value of the power value of continuous N+1 components of the channel impulse response estimation vector of M+1 components, covering the M+1 components.

The channel impulse response setting means is adapted to set a channel impulse response componentwise representative value on the basis of the sum value determined by each adder, while detecting the monitoring signal, and to determine a corresponding adder to a maximum channel impulse response componentwise representative value.

In other words, the channel impulse response setting means serves as a maximum response component detector means that accumulates the sum value determined by each adder, while detecting the monitoring signal, to thereby provide a corresponding component to the adder with respect to an intermediate parameter vector consisting of M−N+1 components which are thus one-to-one correspondent to the adders, respectively, and that determines, while not detecting the monitoring signal, a maximum component of the parameter vector to thereby determine a corresponding adder to the maximum component.

The control means determines corresponding N+1 components to the corresponding adder of the channel impulse response estimation vector of M+1 components and, selects the corresponding N+1 components to generate the channel impulse response estimation vector of N+1 components.

According to an individual of this species of the invention, the channel impulse response setting means comprises an integrator group consisting of M−N+1 integrators each for integrating the sum value to obtain the channel impulse response componentwise representative value while detecting the monitoring signal, and a maximum value detector means for detecting the maximum channel impulse response componentwise representative value while not detecting the monitoring signal and for determining the corresponding adder thereto.

Further, to achieve the object, another genus of the invention provides a method for a decision to conduct an adaptive maximum likelihood sequence estimation by equalizing a reception signal to thereby output a decision result, the reception signal having distortions due to an intersymbol interference from among N symbols, where N is an integer. The method comprises three steps.

A first step executes the decision depending on a channel impulse response estimation vector of N+1 components representative of an estimated channel impulse response.

A second step generates a channel impulse response estimation vector of M+1 components representative of an intersymbol interference from among M symbols, where M is such an integer that 0<N<M, depending on the reception signal and the decision result.

And, a third step converts the channel impulse response estimation vector of M+1 components into the channel impulse response estimation vector of N+1 components.

The third step may include the substeps of converting the channel impulse response estimation vector of M+1 components into an intermediate parameter vector of M−N+1 components, and converting the parameter vector into the channel impulse response estimation vector of N+1 components.

Still more, to achieve the object, another genus of the invention provides a method for a decision to conduct an adaptive maximum likelihood sequence estimation by equalizing a reception signal on a burst consisting of a training sequence field and a data sequence field to thereby output a decision result, the reception signal having distortions due to an intersymbol interference from among N symbols, where N is an integer. The method comprises six steps.

A first step executes the decision depending on a channel impulse response estimation vector of N+1 components representative of an estimated channel impulse response.

A second step generates a monitoring signal while detecting the training sequence field.

A third step generates a training sequence pattern while detecting the monitoring signal.

A fourth step outputs the training sequence pattern, while detecting the monitoring signal, or the decision result, while not detecting the monitoring signal.

A fifth step generates a channel impulse response estimation vector of M+1 components representative of an intersymbol interference from among M symbols, where M is such an integer that 0<N<M, depending on the reception signal on the burst and on the training sequence pattern and the decision result, as either of these is output at the outputting step.

And, a sixth step converts the channel impulse response estimation vector of M+1 components into the channel impulse response estimation vector of N+1 components, while detecting the monitoring signal.

The sixth step may include the substeps of converting the channel impulse response estimation vector of M+1 components into an intermediate parameter vector of M−N+1 components, and converting the parameter vector into the channel impulse response estimation vector of N+1 components.

It will be understood that in any genus of the invention, a channel impulse response vector longer (i.e. larger in number of components) than a symbolized reception signal is estimated, before reducing it into another channel impulse response vector that is still longer than the reception signal. A parameter vector of an intermediate length may be employed, as circumstances require to achieve a facilitated reduction of length.

According to the present invention, a channel impulse response is estimated from inequalizable symbols in a maximum likelihood sequence estimator, with adapted lengths in terms of component number to cause an intersymbol interference. From among components of the channel impulse response, a selection is made to have such ones that can cause an equalizable intercode interference in the maximum likelihood sequence estimator. These components are supplied to the estimator, permitting an accurate channel impulse response to be estimated unless inequalizable intercode interference components exceed a critical level to prevent an erroneous decision. In that sense, an according channel impulse response estimator is free from unstable actions or decision errors.

Moreover, according to the invention, a maximum likelihood sequence estimator of a conventional type is applicable as it is, subject to a simple modification of a channel impulse response estimator without complexity. No past decision results are employed to permit a prompt follow to variations with time of intersymbol interference components.

BRIEF DESCRIPTION OF THE DRAWINGS

The objects, features and advantages of the present invention will become more apparent from consideration of the following detailed description, taken in conjunction with the accompanying drawings, in which.

DESCRIPTION OF THE PREFERRED EMBODIMENTS

There will be detailed below preferred embodiments of the present invention, with reference to FIGS. 2 to 7.

Figure 2:
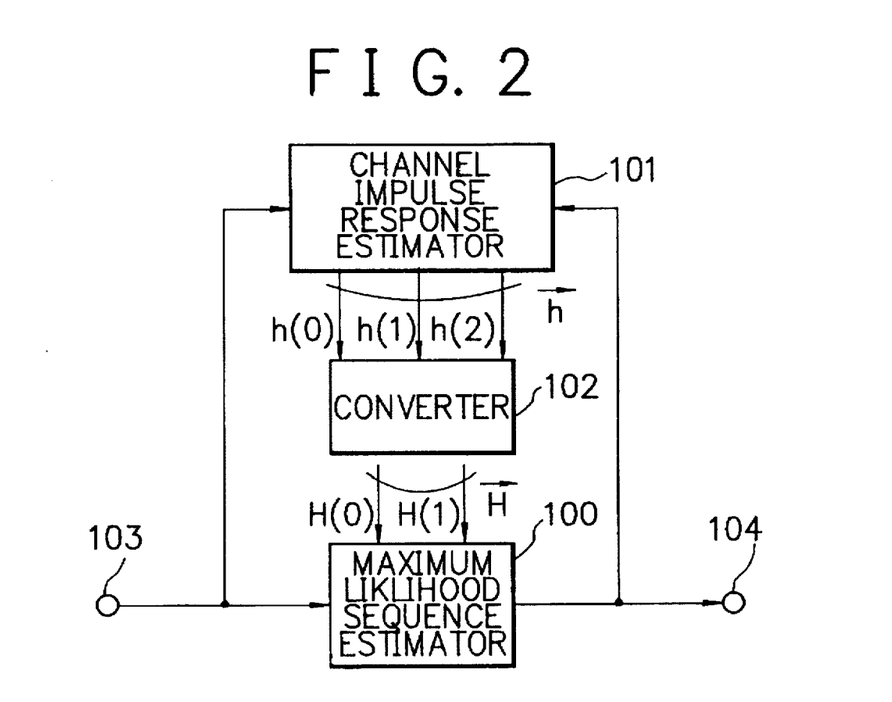
FIG. 2 is a block diagram of an adaptive maximum likelihood sequence estimation system according to an embodiment of the invention, where M=2 and N=1.

FIG. 2 shows an adaptive maximum likelihood sequence estimation system according to a first embodiment of the invention, in which M=2 and N=1.

The estimation system according to the present embodiment comprises a maximum likelihood sequence estimator 100 connected at the input side thereof to an input terminal 103 of the system and at the output side thereof to an output terminal 104 of the system, a channel impulse response estimator 101 connected at a reception signal input end thereof to the input terminal 103 and at a feedback signal input end thereof to the output terminal 104, and a converter 102 interconnected between the channel impulse response estimator 101 and the maximum likelihood sequence estimator 100.

A reception signal is input through the input terminal 103 respectively to the maximum likelihood sequence estimator 100 which is implemented to equalize an intersymbol interference from a single symbol, and to the channel impulse response estimator 101 which is implemented to estimate a channel impulse response to generate an intercode interference of a pair of symbols, i.e., a channel impulse response vector of three components.

In the conventional adaptive maximum likelihood sequence estimation system of FIG. 1, if the maximum likelihood sequence estimator 1000 is implemented to equalize an intercode interference from a single symbol, the channel impulse response estimator 1001 is to be implemented to estimate a channel impulse response to generate an intersymbol interference of a single symbol, i.e., a channel impulse response vector of two components. Details of such implementation is discussed in "Digital Communications" by J. G. Proakis, N.Y., MacGraw-Hill, 1983.

The channel impulse response estimator 101 employs the reception signal from the input terminal 103 and a decision result fed back from the output terminal 104 to output a channel impulse response estimation vector h of three components, such that: h=(h(0), h(1), h(2)). This estimator 101 may comprise a simply extended modification of the channel impulse response estimator 1001 of FIG. 1. The channel impulse response estimation vector h of three components is input to the converter 102, where it is converted into a channel impulse response estimation vector H of two components to be input to the maximum likelihood sequence estimator 100, where the reception signal through the input terminal 103 also is input. The maximum likelihood sequence estimator 100 equalizes the input signals thereto to output a decision result through the output terminal 104. Component signals of the estimation vector h to be input to the converter 102 may preferably be averaged, exemplarily through reduction filters, to thereby stabilize the operation of the converter 102.

Figure 3:
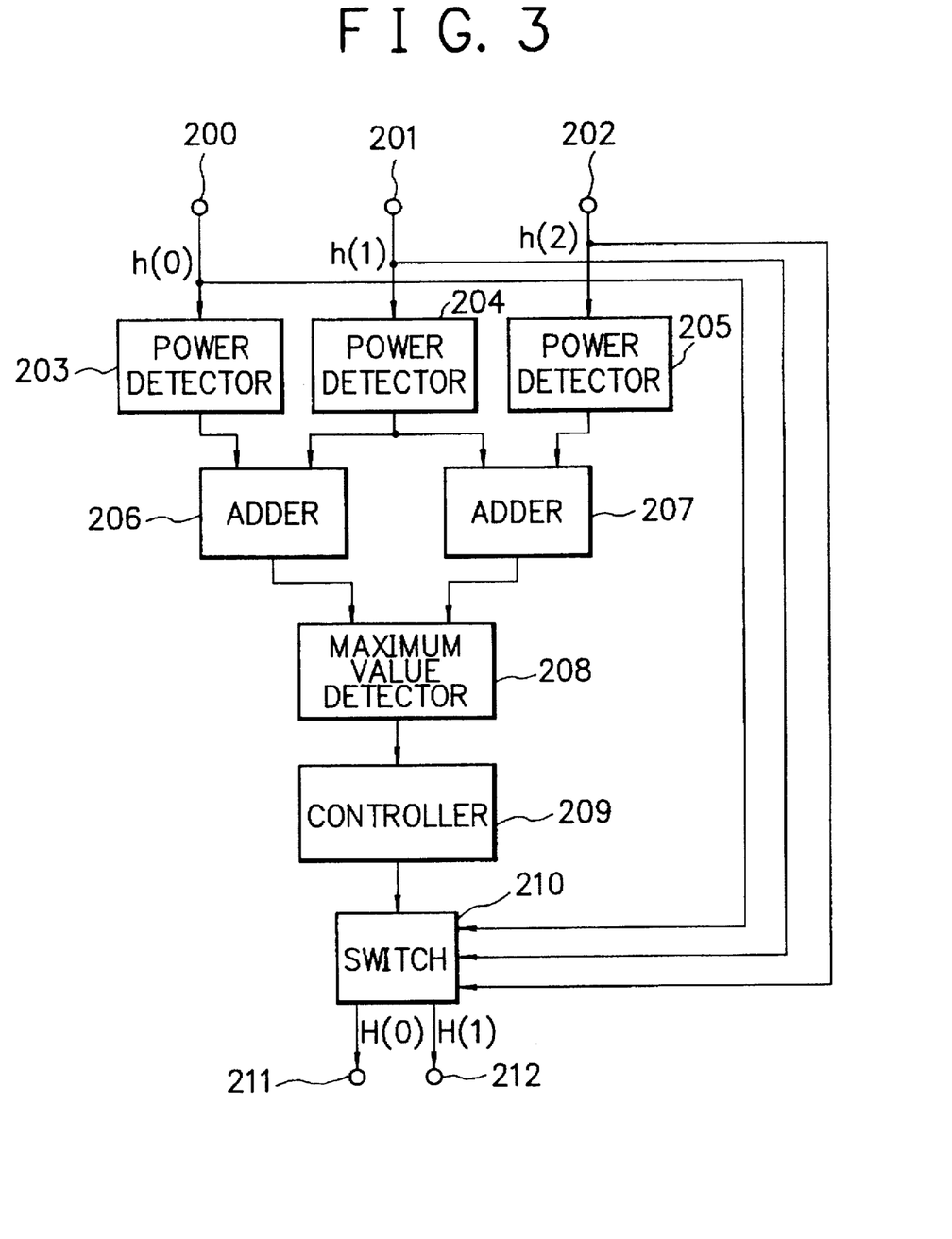
FIG. 3 is a block diagram of an exemplary conversion circuit according to the invention, where M=2 and N=1.

The converter 102 may comprise a variety of applicable circuits, such as an example shown in FIG. 3, in which M=2 and N=1.

The examplarily shown converter circuit in FIG. 3 comprises a triple of power detectors 203, 204 and 205 connected at their input ends to a triple of input terminals 200, 201 and 202 of the converter circuit, respectively, a pair of adders 206 and 207 connected at the input side thereof to corresponding ones of the power detectors 203, 204 and 205, a maximum value detector 208 connected at the input side thereof to the adders 206 and 207, a controller 209 connected at the input side thereof to the maximum value detector 208, and a switch 211 connected at a control signal input terminal thereof to the controller 209, at vector (h) component signal input terminals thereof to the input terminals 200, 201 and 202 of the converter circuit and at vector (H) component output terminals thereof to a pair of output terminals 211 and 212 of the converter circuit.

The estimation vector h output from the channel impulse response estimator 101 has three components h(0), h(1) and h(2) thereof input, through the input terminals 200, 201 and 202 of the converter circuit, to the power detectors 203, 204 and 205, respectively, where their associated power levels are detected by calculation to be input to the adders 206 and 207. In the present converter circuit in which M=2 and N=1, the number A of necessary adders to be A=M−N+1 should be two, and the adders 206 and 207 are employed. The adder 206 inputs respective outputs of the power detectors 203 and 204, and the adder 207 inputs respective outputs of the power detectors 204 and 205.

In a general case where M=m and N=n (n<m), a channel impulse response estimation vector h'=(h(0)', h(1)', . . . , h(m)') has m+1 components thereof input to m+1 power detectors of an associated converter circuit, where their power levels are determined to be input to m−n+1 adders each of which receives corresponding power level signals to n continuous components h(i)', h(i+1)', . . . , h(i+n)' of the estimation vector h, where i is an arbitrary integer from 0 to m−n, both inclusive.

In the present converter circuit, the adders 206 and 207 have their power-level sum representative outputs input to the maximum value detector 208, which compares input power level sums to determine a maximum value thereamong, employing the result to identify which adder 206 or 207 has output a corresponding sum, before outputting an identifier of an associated power detector group 203, 204 or 204, 205 therewith, which is input to the controller 209.

The controller 209 responds to the identifier to output, to the switch 210, a control signal that represents which combination h(0), h(1) or h(1), h(2) out of respective components h(0), h(1), h(2) of the estimation vector h has been input to the associated power detector group 203, 204 or 204, 205 with the maximum value.

The switch 210 receiving the output control signal from the controller 209 and the respective components h(0), h(1), h(2) of the estimation vector h follows the control signal, to select two h(0), h(1) or h(1), h(2) of the three vector components h(0), h(1), h(2) that are to be output therefrom as components H(0), H(1) of the converted channel impulse response estimation vector H.

In the general case where M=m and N=n (n<m), an employed switch follows a control signal to select n+1 of m+1 components h(0)', h(1)', . . . , h(m)' of the channel impulse response estimation vector h'. The selected n+1 components of vector h' are employed as components of a converted channel impulse response estimation vector H' to be output.

In the present embodiment, the maximum likelihood sequence estimator 100 receiving the converted channel impulse response estimation vector H from the converter 102 and the reception signal through the input terminal 103 of the estimation system equalizes the reception signal on the basis of the estimation vector H, to output a decision result through the output terminal 104 of the system.

Figure 4:
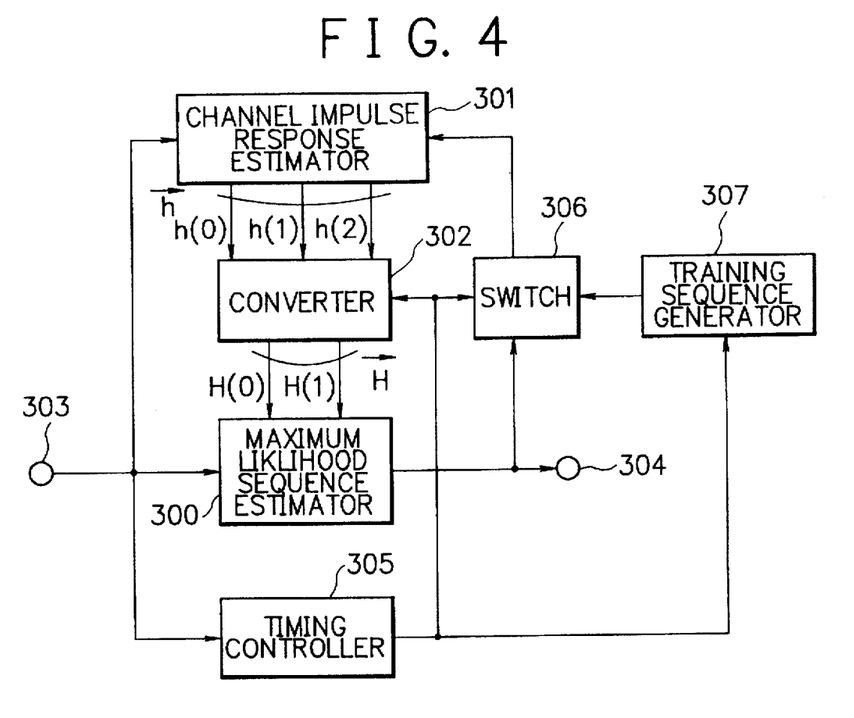
FIG. 4 is a block diagram of an adaptive maximum likelihood sequence estimation system according to another embodiment of the invention, where M=2 and N=1.

FIG. 4 shows an adaptive maximum likelihood sequence estimation system according to a second embodiment of the invention, in which M=2 and N=1.

The estimation system according to the present embodiment comprises a maximum likelihood sequence estimator 300 connected at the input side thereof to an input terminal 303 of the system and at the output side thereof to an output terminal 304 of the system, a channel impulse response estimator 301 connected at a reception signal input end thereof to the input terminal 303, a converter 302 interconnected between the channel impulse response estimator 301 and the maximum likelihood sequence estimator 300, a timing controller 305 connected at a reception signal input end thereof to the input terminal 303, a switch 306 interconnected between a feedback signal input terminal of the channel impulse response estimator 301 and the output terminal 304, and a training sequence generator 307 connected at the output side thereof to the switch 306. The timing controller 305 has a control signal output terminal thereof connected to the inverter 302, the switch 306 and the training sequence generator 307.

Figure 5:
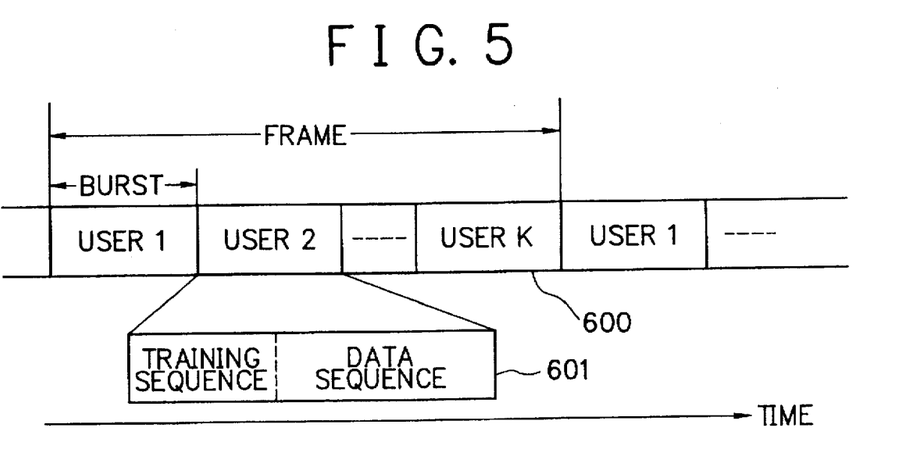
FIG. 5 is a time chart of a time-dividingly multiplexed signal format applicable to the invention.

The estimation system according to the present embodiment may preferably be applied to a reception of a transmitted signal in a given frame format in FIG. 5.

In FIG. 5, designated at character 600 is a formatted frame. The frame 600 is multiplexed in a time-dividing manner into K bursts 601 each constituting a communication channel. Each burst 601 includes a training sequence field and a data sequence field.

The estimation system of FIG. 4 receives at the input terminal 303 a transmitted signal in the form of a burst. This reception signal is input respectively to the maximum likelihood sequence estimator 300, the channel impulse response estimator 301 and the timing controller 305 which detects a training sequence field in the reception signal and, while the training sequence field is detected, keeps outputting a control signal as a monitor signal representing a training sequence being processed.

This control signal is input respectively to the converter 802, the switch 806 and the training sequence generator 307 which keeps, while the control signal is being input, outputting a training sequence of a predetermined pattern.

This output signal from the training sequence generator 307 and a decision result representative feedback signal from the maximum likelihood sequence estimator 300 are input to the switch 306, which outputs the former signal, when receiving the control signal from the timing controller 305, and the latter signal, when not receiving the control signal.

The maximum likelihood sequence estimator 300 receiving the reception signal through the input terminal 303 further receives a channel impulse response estimation vector H of two components from the converter 302, employing this vector H to decode the reception signal in a similar manner to the case in the maximum likelihood sequence estimator 100 of FIG. 2, thereby obtaining a decision result to be output through the output terminal 304 as well as to the switch 306.

The channel impulse response estimator 301 receives the reception signal input thereto through the input terminal 303 and either the feed back decision result of the maximum likelihood sequence estimator 300 or the training sequence of the predetermined pattern from the training sequence generator 307 input thereto respectively through the switch 306, as described, and outputs a channel impulse response estimation vector h of three components h(0), h(1), h(2) to the converter 302.

The maximum likelihood sequence estimator 300 and the channel impulse response estimator 301 may preferably be constituted to be similar to the maximum likelihood sequence estimator 100 and the channel impulse response estimator 101 of FIG. 2, respectively.

The converter 302 receives the channel impulse response estimation vector h of three components h(0), h(1), h(2) from the channel impulse response estimator 301 and the control signal from the timing controller 305 that represents a training sequence being processed.

The converter 302 executes a conversion process of a training sequence and a data sequence. For the training sequence, the converter 302 determines a conversion formula for converting the channel impulse response estimation vector h of three components h(0), h(1), h(2) received from the channel impulse response estimator 301 into the channel impulse response estimation vector H of two components to be output, and also for the data sequence, it holds the conversion formula unchanged.

This is because a changed formula for the conversion from the vector h to the vector H may disadvantageously introduce a time lag to a decision result so that, in reception of a signal in the form of a burst, all associated data after any occurrence of the time lag may become erroneous. A series of continuously transmitted signals that may have a long duration interval may thus render large the variation with time of an intersymbol interference.

However, in the converter 302, even if a conversion formula is changed for processing a training sequence, a resulted time lag does not go beyond simply causing a temporal error limited within an associated data frame, before the next data frame naturally absorbs the time lag, thus an overall reception performance to be effectively improved.

Figure 6:
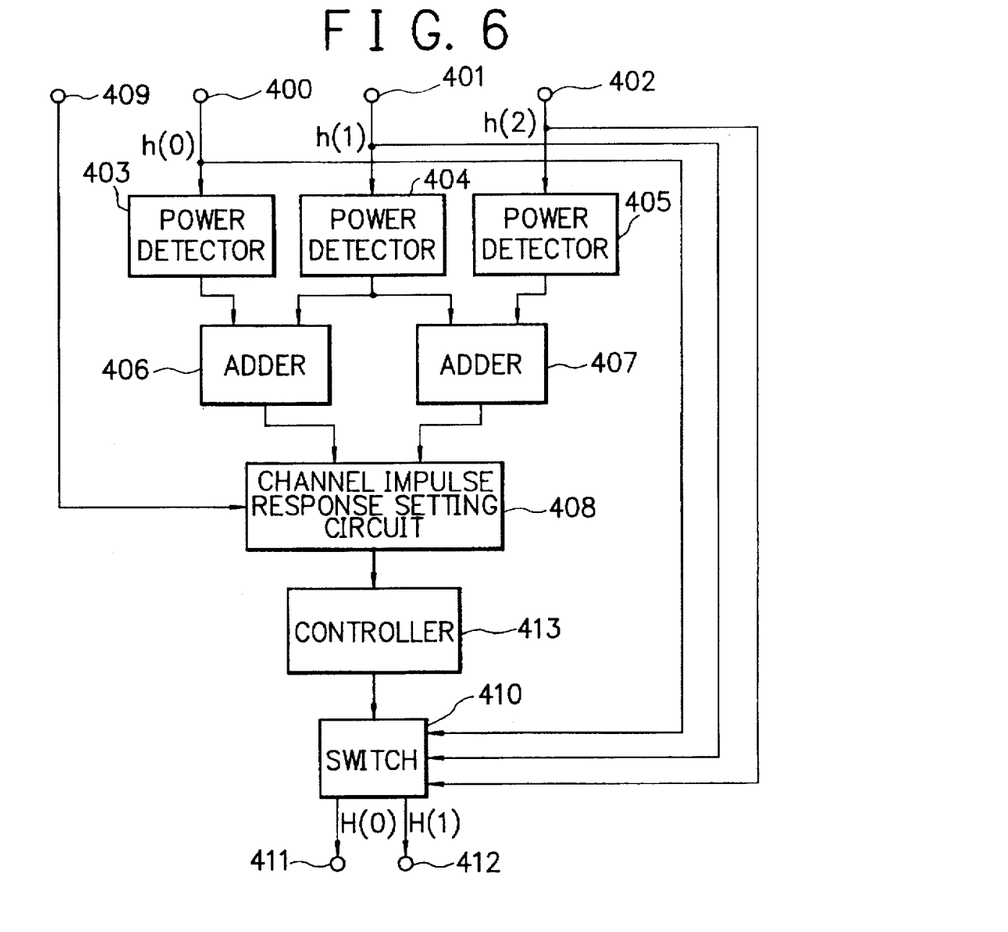
FIG. 6 is a block diagram of another exemplary conversion circuit according to the invention, where M=2 and N=1.

The converter 302 may also comprise a variety of applicable circuits, such as an example shown in FIG. 6, in which M=2 and N=1.

The examplarily shown converter circuit in FIG. 6 comprises a triple of power detectors 403, 404 and 405 connected at their input ends to a triple of input terminals 400, 401 and 402 of the converter circuit, respectively, a pair of adders 406 and 407 connected at the input side thereof to corresponding ones of the power detectors 403, 404 and 405, a channel impulse response setting circuit 408 connected at the input side thereof to the adders 406 and 407 and at a control signal input terminal thereof to another input terminal 409 of the converter circuit, a controller 413 connected at the input side thereof to the channel impulse response setting circuit 408, and a switch 410 connected at a control signal input terminal thereof to the controller 413, at vector (h) component signal input terminals thereof to the input terminals 400, 401 and 402 of the converter circuit and at vector (H) component output terminals thereof to a pair of output terminals 411 and 412 of the converter circuit.

The estimation vector h output from the channel impulse response estimator 301 has three components h(0), h(1) and h(2) thereof input, through the input terminals 400, 401 and 402 of the converter circuit, to the power detectors 403, 404 and 405, respectively, where their associated power levels are detected by calculation to be input to the adders 406 and 407. Also in the present converter circuit in which M=2 and N=1, the number A of necessary adders to be A=M−N+1 should be two, and the adders 406 and 407 are employed. The adder 406 inputs respective outputs of the power detectors 403 and 404, and the adder 407 inputs respective outputs of the power detectors 404 and 405.

Also in a generic modification of the present converter circuit where M=m and N=n (n<m), a channel impulse response estimation vector h'=(h(0)', h(1)', ..., h(m)') has m+1 components thereof input to m+1 power detectors of a converter circuit, where their power levels are determined to be input to m−n+1 adders each of which receives corresponding power level signals to n continuous components h(i)', h(i+1)', ..., h(i+n)' of the estimation vector h, where i is an arbitrary integer from 0 to m−n, both inclusive.

In the present converter circuit, the adders 406 and 407 have their power-level sum representative outputs input to the channel impulse response setting circuit 408 to which is input, through the input terminal 409 of the converter circuit, the control signal from the timing controller 305 that represents a training sequence being processed, too. While this control signal is being input, the setting circuit 408 determines necessary information for a conversion of the vector h to the vector H, on the basis of the outputs of the adders 406 and 407, concurrently outputting the result.

Figure 7:
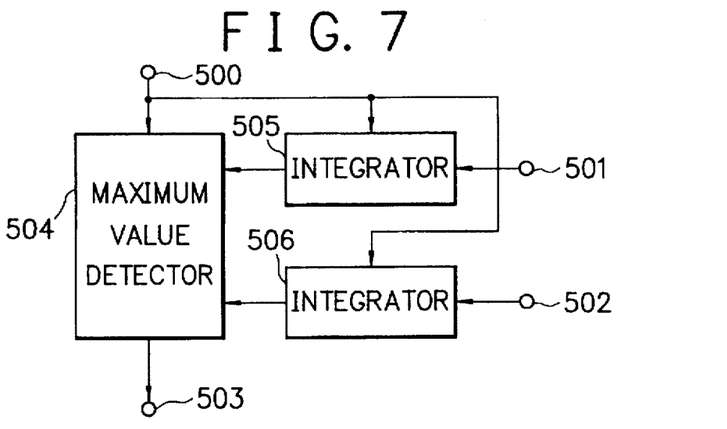
FIG. 7 is a block diagram of an exemplary channel impulse response setting circuit according to the invention, where M=2 and N=1.

The channel impulse response setting circuit 408 may also comprise a variety of applicable circuits, such as an example shown in FIG. 7, where M=2 and N=1.

The examplarily shown setting circuit in FIG. 7 comprises a maximum value detector 504 connected at the input and output ends thereof to a control signal input terminal 500 and an indentifier output terminal 503 of the setting circuit, respectively, and a pair of integrators 505 and 506 interconnected between the maximum value detector 504 and power level sum input terminals 501 and 502 of the setting circuit, respectively, the integrators 505 and 506 having their control signal input terminals connected to the control signal input terminal 500 of the setting circuit.

In the exemplary setting circuit, power-level sum representative outputs from the adders 406 and 407 are input through the input terminals 501 and 502 to the integrators 505 and 506, respectively, where they are integrated while the integrators 505 and 506 are receiving through the input terminal 500 the control signal from the timing controller 305 that represents a training sequence being processed.

In a generic modification of the channel impulse response setting circuit where M=m and N=n (n<m), a correspondent integration is effected by use of a group of integrators amounting to m−n+1 in total.

The results of integration are output from the integrators 505 and 506 to the maximum value detector 504, upon interruption of reception of the control signal, when the maximum value detector 504, judging therefrom that the processing of the training sequence has finished, compares input total sums of power level from the integrators 505 and 506, thereby detecting a maximum value thereamong.

The maximum value detector 504 employs the result of detection to identify which adder 406 or 407 has contributed to the integration that has produced the maximum value, before it outputs an identifier of a corresponding one of the adders 406 and 407, as necessary information for a conversion from the vector h to the vector H. The identifier is input from the maximum value detector 504 to the controller 413.

The controller 413 responds to the identifier to output, to the switch 410, a control signal that represents which combination h(0), h(1) or h(1), h(2) out of respective components h(0), h(1), h(2) of the estimation vector h has been input to an associated power detector group 403, 404 or 404, 405 with the maximum value.

The switch 410 receiving the output control signal from the controller 413 and the respective components h(0), h(1), h(2) of the estimation vector h follows the control signal, to select two h(0), h(1) or h(1), h(2) of the three vector components h(0), h(1), h(2) that are to be output therefrom as components H(0), H(1) of the converted channel impulse response estimation vector H.

To decode a transmitted signal in the form of a burst, the signal may preferably be stored in a memory before the decoding.

In that case, a training sequence may be once read from the memory and input to the converter 302, to first determine therefrom a conversion formula for converting the vector h to the vector H. Thereafter, the training sequence may be again read from the memory, together with a data sequence, to decode the signal.

In that case, the exemplary conversion circuit of FIG. 6 may preferably be applied.

In this case, the power detectors 403, 404 and 405, the adders 406 and 407 and the channel impulse response setting circuit 408 may be operated only when first determining the conversion formula. The determined conversion formula may be stored in the controller 418. The stored formula may thereafter permit the components h(0), h(1) and h(2) of the channel impulse response estimation vector h input through the input terminals 400, 401 and 402 to be converted into the channel impulse response estimation vector H by the switch 410 put under control of the controller 418.

It will be understood that in either embodiment of the invention, a channel impulse response vector h longer (i.e. larger in number of components) than a symbolized reception signal is estimated, before reducing it into another channel impulse response vector H that is still longer than the reception signal. A parameter vector of an intermediate length is employed to achieve a facilitated reduction of length. The parameter vector has component values thereof each determined as a power level sum by a corresponding adder 206, 207 or as an integrated value of such a sum by a corresponding integrator 501, 502 over a duration of a monitoring signal.

It also will be understood that the foregoing embodiments may be materialized by means of a software such as in a digital signal processor.

According to either embodiment of the invention, a transmission system for transmitting data through channels subjected to an intersymbol interference variable with time is permitted to have a simple adaptive maximum likelihood sequence estimation system that can follow temporal variations of the intersymbol interference without a reduced transmission performance, even if distortions are caused by a longer intersymbol interference than expected.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A system for a decision to conduct an adaptive maximum likelihood sequence estimation by equalizing a reception signal thereby to output a decision result, the reception signal having distortions due to an intersymbol interference from among N symbols, where N is an integer, comprising:

a maximum likelihood sequence estimator means for performing the decision depending on a channel impulse response estimation vector of N+1 components representative of an estimated channel impulse response;

a channel impulse response estimator means for generating a channel impulse response estimation vector of M+1 components representative of an intersymbol interference from among M symbols, where M is such an integer that 0<N<M, depending on the reception signal and the decision result; and a converter means for converting the channel impulse response estimation vector of M+1 components into the channel impulse response estimation vector of N+1 components.

2. The system as claimed in claim 1, wherein:

the converter means comprises:

a power detector group of M+1 power detectors each for determining a power value representative of channel impulse response power of a corresponding component of the channel impulse response estimation vector of M+1 components;

an adder group of M−N+1 adders each for determining a sum value of the power value of continuous N+1 components of the channel impulse response estimation vector of M+1 components, covering the M+1 components;

a maximum value detector means for detecting a maximum one of the respective sum values determined by the M−N+1 adders; and a control means for determining corresponding N+1 components to a corresponding adder to the maximum sum value of the channel impulse response estimation vector of M+1 components and for selecting the corresponding N+1 components to generate the channel impulse response estimation vector of N+1 components.

3. The system as claimed in claim 2, wherein:

each power detector of the power detector group generates a corresponding component of a channel impulse response power estimation vector of M+1 components representing the power value; and each adder of the adder group determines the sum value from corresponding N+1 components of the channel impulse response power estimation vector.

4. The system as claimed in claim 2, wherein:

the control means comprises a controller for generating a control signal representative of the corresponding N+1 components to the corresponding adder to the maximum sum value of the channel impulse response estimation vector of M+1 components, and a switch means for responding the control signal to select the corresponding N+1 components of the channel impulse response estimation vector of M+1 components thereby to generate the channel impulse response estimation vector of N+1 components.

5. A system for a decision to conduct an adaptive maximum likelihood sequence estimation by equalizing a reception signal on a burst of a training sequence field and a data sequence field thereby to output a decision result, the reception signal having distortions due to an intersymbol interference from among N symbols, where N is an integer, comprising:

a maximum likelihood sequence estimator means for performing the decision depending on a channel impulse response estimation vector of N+1 components representative of an estimated channel impulse response;

a timing control means for generating a monitoring signal while detecting the training sequence field;

a training sequence pattern generating means for generating a training sequence pattern while detecting the monitoring signal;

an output means for outputting the training sequence pattern while detecting the monitoring signal and for outputting the decision result while not detecting the monitoring signal;

a channel impulse response estimator means for generating a channel impulse response estimation vector of M+1 components representative of an intersymbol interference from among M symbols, where M is such an integer that 0<N<M, depending on the reception signal on the burst and on the training sequence pattern and the decision result, as either of these is output from the output means; and a converter means for converting the channel impulse response estimation vector of M+1 components into the channel impulse response estimation vector of N+1 components, while detecting the monitoring signal.

6. The system as claimed in claim 5, wherein:
the converter means comprises:

a power detector group of M+1 power detectors each for determining a power value representative of a channel impulse response power of a corresponding component of the channel impulse response estimation vector of M+1 components;

an adder group of M−N+1 adders each for determining a sum value of the power value of continuous N+1 components of the channel impulse response estimation vector of M+1 components, covering the M+1 components;

a channel impulse response setting means for setting a channel impulse response componentwise representative value on the basis of the sum value determined by each adder, while detecting the monitoring signal, and for determining a corresponding adder to a maximum channel impulse response componentwise representative value; and a control means for determining corresponding N+1 components to the corresponding adder of the channel impulse response estimation vector of M+1 components and for selecting the corresponding N+1 components to generate the channel impulse response estimation vector of N+1 components.

7. The system as claimed in claim 6, wherein:
the channel impulse response setting means comprises an integrator group of M−N+1 integrators each for integrating the sum value to obtain the channel impulse response componentwise representative value while detecting the monitoring signal, and a maximum value detector means for detecting the maximum channel impulse response componentwise representative value while not detecting the monitoring signal and for determining the corresponding adder thereto.

8. A method for a decision to conduct an adaptive maximum likelihood sequence estimation by equalizing a reception signal thereby to output a decision result, the reception signal having distortions due to an intersymbol interference from among N symbols, where N is an integer, comprising the steps of:

executing the decision depending on a channel impulse response estimation vector of N+1 components representative of an estimated channel impulse response;

generating a channel impulse response estimation vector of M+1 components representative of an intersymbol interference from among M symbols, where M is such an integer that 0<N<M, depending on the reception signal and the decision result; and converting the channel impulse response estimation vector of M+1 components into the channel impulse response estimation vector of N+1 components.

9. A method for a decision to conduct an adaptive maximum likelihood sequence estimation by equalizing a reception signal on a burst of a training sequence field and a data sequence field thereby to output a decision result, the reception signal having distortions due to an intersymbol interference from among N symbols, where N is an integer, comprising the steps of:

executing the decision depending on a channel impulse response estimation vector of N+1 components representative of an estimated channel impulse response;

generating a monitoring signal while detecting the training sequence field;

generating a training sequence pattern while detecting the monitoring signal;

outputting the training sequence pattern while detecting the monitoring signal or the decision result while not detecting the monitoring signal;

generating a channel impulse response estimation vector of M+1 components representative of an intersymbol interference from among M symbols, where M is such an integer that 0<N<M, depending on the reception signal on the burst and on the training sequence pattern and the decision result, as either of these is output at the outputting step; and converting the channel impulse response estimation vector of M+1 components into the channel impulse response estimation vector of N+1 components, while detecting the monitoring signal.

10. A method for a decision to conduct an adaptive maximum likelihood sequence estimation by equalizing a reception signal thereby to output a decision result, the reception signal having distortions due to an intersymbol interference from a predetermined number of symbols, comprising the steps of:

executing the decision depending on a first estimation vector representative of an estimated channel impulse response, the first estimation vector of a larger number of components than the predetermined symbol number;

generating a second estimation vector representative of the estimated channel impulse response, the second estimation vector of a yet larger number of components than the predetermined symbol number; and converting the second estimation vector to the first estimation vector by stepwise reducing the number of components of the second estimation vector.

11. A system for a decision to conduct an adaptive maximum likelihood sequence estimation by equalizing a reception signal thereby to output a decision result, the reception signal having distortions due to an intersymbol interference from among N symbols, where N is an integer, comprising:

a maximum likelihood sequence estimator performing the decision depending on a channel impulse response estimation vector of N+1 components representative of an estimated channel impulse response;

a channel impulse response estimator generating a channel impulse response estimation vector of M+1 components representative of an intersymbol interference from among M symbols, where M is such an integer that 0<N<M, depending on the reception signal and the decision result; and a converter converting the channel impulse response estimation vector of M+1 components into the channel impulse response estimation vector of N+1 components.

12. A system for a decision to conduct an adaptive maximum likelihood sequence estimation by equalizing a reception signal on a burst of a training sequence field and data sequence field thereby to output a decision result, the reception signal having distortions due to an intersymbol interference from among N symbols, where N is an integer comprising:

a maximum likelihood sequence estimator performing the decision depending on a channel impulse response estimation vector of N+1 components representative of an estimated channel impulse response;

a timing controller generating a monitoring signal while detecting the training sequence field;

a training sequence pattern generator generating a training sequence pattern while detecting the monitoring signal;

an output device outputting the training sequence pattern while detecting the monitoring signal and outputting the decision result while not detecting the monitoring signal;

a channel impulse response estimator generating a channel impulse response estimation vector of M+1 components representative of an intersymbol interference from among M symbols, where M is such an integer that 0<N<M, depending on the reception signal on the burst and on the training sequence pattern and the decision result, as either of these is output from the output device means; and a converter converting the channel impulse response estimation vector of M+1 components into the channel impulse response estimation vector of N+1 components, while detecting the monitoring signal.

* * * * *